UNITED STATES PATENT OFFICE.

HEINRICH VOLLBRECHT AND CARL MENSCHING, OF BUFFALO, NEW YORK, ASSIGNORS TO THE SCHOELLKOPF ANILINE AND CHEMICAL COMPANY, OF SAME PLACE.

COLORING-MATTER DERIVED FROM DIAZOBENZOL AND ALPHANAPHTHOL.

SPECIFICATION forming part of Letters Patent No. 333,041, dated December 22, 1885.

Application filed January 13, 1885. Serial No. 152,810. (Specimens.)

*To all whom it may concern:*

Be it known that we, HEINRICH VOLLBRECHT and CARL MENSCHING, of the city of Buffalo, in the county of Erie and State of New York, have invented new and useful Improvements in the Manufacture of Dye-Stuffs or Coloring-Matters, of which the following is a specification.

Our invention relates to a new dye-stuff which results from the reaction of diazobenzol with the soda salt of our new naphtholmonosulphonic acid. In preparing this acid we proceed as follows: In nitrating alphanaphthalinemonosulphonic acid, which acid is made in the well-known manner, two nitromonosulphonic acids are formed, which, after being converted into their amido compounds by known methods, result in two naphthylaminesulphonic acids. These can be easily separated on account of the unequal solubility of their salts in water.

The acid whose sodium salt is easily soluble in water is the raw material for the production of our new color-producing naphtholmonosulphonic acid.

In producing this new naphtholmonosulphonic acid we dissolve two hundred and forty-five pounds of the sodium salt of the described naphthylaminemonosulphonic acid in about four thousand pounds of water, and add to it one hundred and fifty pounds of sulphuric acid of 66° Baumé. We cool this down to 5° centigrade and add slowly seventy pounds of sodium nitrite dissolved in three hundred pounds of water. The mixture is left now at rest for twenty-four hours. When the diazo compound of said naphthylaminesulphonic acid is formed, we pour it slowly into boiling water, to which a small quantity of sulphuric acid is added. Then we boil with steam until the reaction is finished.

The soda salt of the newly-formed naphtholmonosulphonic acid is now prepared by any known method, and can be used directly for producing coloring-matter.

We prepare the new dye-stuff herein claimed as follows: We dissolve ninety-three pounds of aniline in three hundred pounds of muriatic acid. To this solution we add about two thousand pounds of water. We cool the mixture so prepared to from 4° to 6° centigrade, and then pour into it slowly a solution of seventy pounds of sodium nitrite. When the desired reaction is completed—that is to say, when the aniline is transformed into diazobenzol—we slowly pour this into a solution of two hundred and sixty-eight pounds of the sodium salt of our new naphtholmonosulphonic acid above referred to. Alkali must be present throughout the whole operation for neutralization.

The new dye-stuff is precipitated out of its solution by common salt and purified by again dissolving and precipitating it in the usual manner.

All hitherto-known naphtholmonosulphonic acids produce, when combined with diazobenzol, dyes or coloring-matters of an orange color, while our new acid produces with diazobenzol a bright scarlet dye.

If we use diazobenzolmonosulphonic acid instead of diazobenzole, we get a dye-stuff somewhat more bluish in shade.

Our new coloring-matter is the result of the reaction of the substances in solution as shown by the following formula:

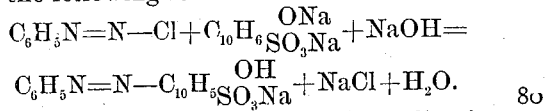

We do not wish to claim in this application the herein-described new naphtholmonosulphonic acid, as the latter is claimed in an application filed by us January 13, 1885, No. 152,809.

We claim as our invention—

As a new product, the dye-stuff or coloring-matter which results from the reaction of diazobenzol with the solution of the sodium salt of our herein-described new naphtholmonosulphonic acid, substantially as set forth.

Witness our hands this 3d day of December, 1884.

H. VOLLBRECHT.
C. MENSCHING.

Witnesses:
JNO. J. BONNER,
C. F. GEYER.